June 20, 1933.  E. J. SCOTT  1,914,928
COUPLING DEVICE
Filed Nov. 18, 1931
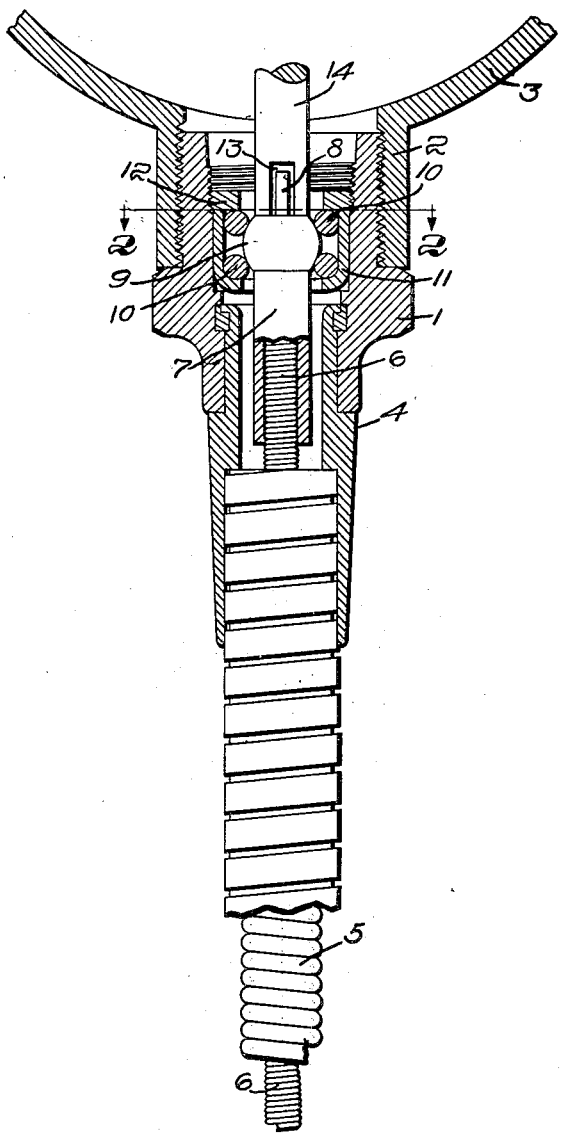
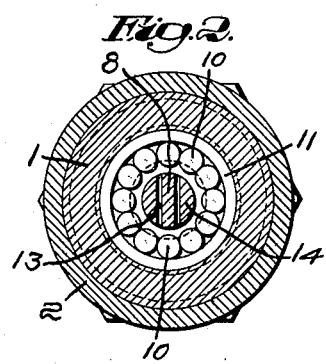
Inventor:
Ephriam J. Scott,
By Emery, Booth, Varney & Townsend
Attys Patented June 20, 1933

1,914,928

UNITED STATES PATENT OFFICE

EPHRIAM J. SCOTT, OF SOMERVILLE, MASSACHUSETTS, ASSIGNOR TO BARBOUR STOCKWELL COMPANY, OF CAMBRIDGE, MASSACHUSETTS, A CORPORATION OF MASSACHUSETTS

COUPLING DEVICE

Application filed November 18, 1931. Serial No. 575,797.

My invention aims to provide improvements in coupling devices.

In the drawing which illustrates a preferred embodiment of my invention:—

Figure 1 is a longitudinal view of a structure showing my invention, some of the parts of the associated structure being in cross-section and other parts being in elevation;

Fig. 2 is a section taken on the line 2—2 of Figure 1.

Referring now to the particular embodiment of my invention selected for illustration, I have shown a coupling device particularly, though not exclusively, adapted for use for connecting a flexible driving shaft to the operating mechanism of a tachometer, speedometer or the like. Portions only of the meter device and the flexible drive shaft are shown in the drawing.

The coupling device shown comprises a casing which includes a part 1 threaded into a boss 2 projecting from the meter casing 3, as best shown in Figure 1. A second part 4 of the casing is attached to the part 1 in the usual manner so that it may be free to turn relative thereto. The usual flexible hollow cable 5 is attached to the part 4 and the flexible drive shaft 6 is located within the hollow cable 5 and is free to rotate therein. The flexible drive shaft shown is made up of superposed spring-like units.

The coupling device also includes a rotatable part 7 which is hollow at one end and has a tongue 8 at the other end. Adjacent to the tongue 8 there is provided on the part 7 a ball-like portion 9 which engages with two spaced rows of ball bearings 10 (Fig. 1). The ball bearings 10 are supported in a cup-shaped part 11 inserted in the casing and are held in place by an adjustable washer 12 threaded into engagement with the part 1. The cooperative arrangement of the ball bearings and the ball-like surface in engagement therewith supports the rotatable part 7 in such a manner that the friction against rotation is reduced to a minimum. The curved surface of the ball-like portion 9 in combination with the two spaced rows of ball bearings 10 permits the rotatable part to be free of contact with the ball bearings 10 except for a single point contact with each ball. This is a decided improvement over other known constructions, because it reduces the number of points of contact between the ball bearings and the rotating part to an absolute minimum.

I have found that it is desirable to permit movement of the axis of the rotatable member relative to the axis of the casing of the coupling device and, therefore, the rotatable member 7 is constructed to be spaced from the casing, it contacting only with the ball bearings 10. Therefore, with the arrangement shown, the rotatable member is free to move angularly about the center of the ball-like portion 9, as will be well understood by those skilled in the art. I have found that the pivotal movement of the part 7 adds flexibility to the drive, reduces binding action and greatly improves the connection with the flexible drive shaft 6. It has been found that most cases of breakage of the flexible drive shaft have occurred at the point where it enters the hollow rotatable part 7. With my devices breakage at that point will be decreased because of the fact that the rotatable part 7 is free to move with the flexible shaft 6 and in a sense is flexible with it.

The tongue 8 enters a slot 13 in a shaft 14 of the meter mechanism and makes a connection whereby the mechanism is rotated with the part 7 and the shaft 6.

I am aware of the fact that coupling devices of the same general construction are old as, for instance, is shown in United States Letters Patent to Leon E. Blanchard No. 1,129,329, issued February 23, 1915. My invention, however, is a decided improvement over the known constructions because it provides for a reduction in the frictional contact between the parts and increases the flexibility of the entire combination of the structure described. Anyone skilled in the art will, therefore, understand the important advantages of these features of my invention, especially in connection with devices used to secure accurate meter readings.

While I have illustrated and described a preferred embodiment of my invention I do not wish to be limited thereby, because the scope of my invention is best defined by the following claims.

I claim:

1. A coupling device for the connection of a flexible driving shaft to the operating mechanism of a meter device, said coupling device having a housing adapted to be attached to the meter device, a rotatable part within the housing, a flexible shaft connected directly to said rotatable part, means provided by the rotatable part for loosely engaging the meter device in a driving connection therewith and bearing means provided partly in the housing and partly by the rotatable part and constructed and arranged to permit angular movement of the axis of the rotatable part relative to the axis of the housing when the flexible shaft is moved out of line with the axis of the housing.

2. A coupling device for the connection of a flexible driving shaft to the operating mechanism of a meter device, said coupling device having a housing adapted to be attached to the meter device, a rotatable part within the housing, a flexible shaft connected directly to said rotatable part, means provided by the rotatable part for loosely engaging the meter device in a driving connection therewith, a ball-like portion provided by said rotatable part and bearing members arranged between said ball-like portion and said casing to provide the only means for supporting said rotatable part relative to said casing, and the remainder of said rotatable part being spaced from the casing whereby the axis of said rotatable member may be moved relative to the axis of the casing with the center of the ball-like portion acting as the pivot when the flexible shaft is moved out of line with the axis of the housing.

3. A coupling device for the connection of a flexible driving shaft to the operating mechanism of a meter device, said coupling device having a housing adapted to be attached to the meter device, a rotatable part within the housing, a flexible shaft connected directly to said rotatable part, means provided by the rotatable part for loosely engaging the meter device in a driving connection therewith, a ball-like portion provided by said rotatable part and a series of ball bearings supported in said housing and engaging said ball-like portion of said rotatable part to support said rotatable part in pivotal relation to said casing for the purposes described.

In testimony whereof, I have signed my name to this specification.

EPHRIAM J. SCOTT.